(12) United States Patent
Hioki et al.

(10) Patent No.: US 8,497,653 B2
(45) Date of Patent: Jul. 30, 2013

(54) DRIVER CIRCUIT FOR DRIVING A STEPPING MOTOR

(75) Inventors: Kosaku Hioki, Ogaki (JP); Kazumasa Takai, Kagamigahara (JP); Takeshi Naganuma, Inazawa (JP); Yoshihiro Niwa, Gifu (JP)

(73) Assignee: Semiconductor Components Industries, LLC, Phoenix, AZ (US)

( * ) Notice: Subject to any disclaimer, the term of this patent is extended or adjusted under 35 U.S.C. 154(b) by 396 days.

(21) Appl. No.: 12/695,555

(22) Filed: Jan. 28, 2010

(65) Prior Publication Data

US 2010/0188036 A1 Jul. 29, 2010

(30) Foreign Application Priority Data

Jan. 28, 2009 (JP) ................................ 2009-017246
Dec. 28, 2009 (JP) ................................ 2009-298091

(51) Int. Cl.
G05B 19/40 (2006.01)

(52) U.S. Cl.
USPC ........... 318/685; 318/606; 318/693; 318/694; 318/695

(58) Field of Classification Search
USPC ............ 318/685, 599, 606, 693–695, 400.32, 318/400.34

See application file for complete search history.

(56) References Cited

U.S. PATENT DOCUMENTS

| 6,906,485 | B2 * | 6/2005 | Hussein | 318/400.28 |
| 7,183,734 | B2 * | 2/2007 | Lassen | 318/400.34 |
| 7,893,638 | B2 * | 2/2011 | Akama et al. | 318/400.14 |
| 8,072,177 | B2 * | 12/2011 | Arisawa | 318/685 |
| 8,179,081 | B2 * | 5/2012 | Niwa et al. | 318/696 |
| 8,217,603 | B2 * | 7/2012 | Akama et al. | 318/400.21 |
| 2009/0174350 | A1 * | 7/2009 | Kuroda et al. | 318/400.11 |

FOREIGN PATENT DOCUMENTS

| JP | 08-037798 | 2/1996 |
| JP | 2006-288056 | 10/2006 |
| JP | 2007-020309 A | 1/2007 |
| KR | 1999-0051570 | 7/1999 |

OTHER PUBLICATIONS

Korean Notice of Grounds for Rejection, w/ English translation thereof, issued in Korean Patent Application No. KR 10-2010-0007365 dated Jun. 10, 2011.

* cited by examiner

*Primary Examiner* — Erick Glass
(74) *Attorney, Agent, or Firm* — McDermott Will & Emery LLP

(57) ABSTRACT

An amount of a motor drive current is controlled to an appropriate value. Two coils are provided, and a rotor is rotated by the coils by setting different phases for the supplied currents to the two coils. During a phase where one of the coils is in a high-impedance state, an induced voltage generated in the coil is detected. According to the state of the induced voltage, an output control circuit controls the amounts of the motor drive currents supplied to the two coils.

5 Claims, 15 Drawing Sheets

US 8,497,653 B2

DRIVER CIRCUIT FOR DRIVING A STEPPING MOTOR

CROSS-REFERENCE TO RELATED APPLICATIONS

The entire disclosure of Japanese Patent Application Nos. 2009-017246 and 2009-298091 including specification, claims, drawings, and abstract is incorporated herein by reference.

BACKGROUND OF THE INVENTION

1. Field of the Invention

The present invention relates to a driver circuit of a stepping motor which includes two coils and which rotates a rotor which is driven by the coils by setting different phases of supplied currents for the two coils.

2. Description of the Related Art

Various motors are known. As a motor which can accurately determine a position, a stepping motor is known, and is widely in use in various devices. For example, the stepping motor is used for focusing in a camera, antivibration, positioning in a machine tool, etc. The demand for the stepping motor is especially high in OA devices which require a large current.

The driving of the stepping motor is executed normally by changing a rotational position of a rotor with phases of currents to two stator coils. Therefore, if the rotor rotates according to the phase of the current to the coil, the rotor rotates in a predetermined manner regardless of the amount of current to the coil. In general, in order to ensure that the rotor rotates reliably, a sufficiently large amount of current is used as the amount of current to the coil.

There is a demand to minimize the power consumption in electronic devices. This demand is particularly high for battery-driven portable devices or the like. On the other hand, to allow the rotor to rotate reliably, the amount of current in the driving of the stepping motor is set to a sufficient amount. This means that a redundant current is applied to the coil and redundant power is consumed.

SUMMARY OF THE INVENTION

According to one aspect of the present invention, there is provided a driver circuit which supplies a motor drive current to two coils of a stepping motor. A rotor is rotated by the coils by setting different phases for the motor drive currents to the two coils. During a phase where a first coil of the two coils is in a high-impedance state, an induced voltage generated in the first coil is detected, and amounts of the motor drive currents supplied to the two coils are controlled according to a state of the detected induced voltage.

With such a configuration, the amount of the motor drive current can be controlled to a suitable value.

BRIEF DESCRIPTION OF THE DRAWINGS

Preferred embodiments of the present invention will be described in further detail based on the following drawings, wherein.

DESCRIPTION OF THE PREFERRED EMBODIMENTS

Preferred embodiments of the present invention will now be described with reference to the drawings.

Figure 1:
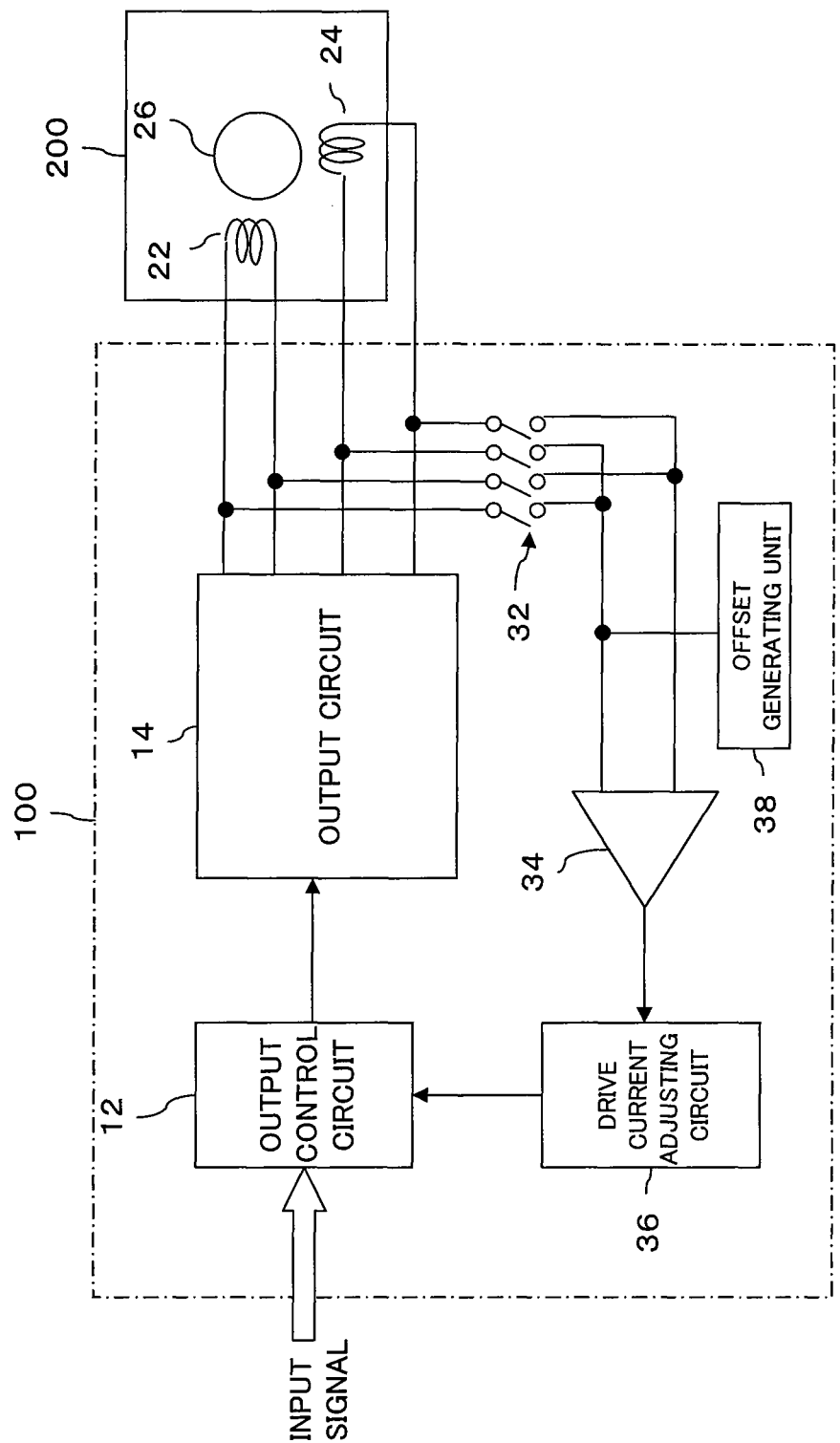
FIG. 1 is a diagram showing an overall structure of a system including a driver circuit according to a preferred embodiment of the present invention.

FIG. 1 is a diagram showing an overall structure of a system, and the system comprises a driver 100 and a motor 200. An input signal is input to the driver 100, and the driver 100 supplies a drive current corresponding to the input signal to the motor 200. In this manner, rotation of the motor 200 is controlled according to the input signal.

The driver 100 has an output control circuit 12, and the input signal is supplied to the output control circuit 12. The output control circuit 12 determines a drive waveform (phase) of a predetermined frequency according to the input signal, determines an amplitude of the drive current through PWM control, and generates a drive control signal. The generated drive control signal is supplied to an output circuit 14.

The output circuit 14 comprises a plurality of transistors, and a current from a power supply is controlled by switching of the transistors so that a motor drive current is generated and supplied to the motor 200.

The motor 200 is a stepping motor, and has two coils 22 and 24 and a rotor 26. The two coils 22 and 24 are placed with a deviation in position of 90° in electrical angle from each other, and thus the directions of magnetic fields with respect to the rotor 26 are deviated by 90° in electrical angle from each other with respect to the center angle of the rotor. In addition, the rotor 26 comprises, for example, a permanent magnet, and a stable position is determined according to the magnetic fields from the two coils 22 and 24. That is, by supplying AC currents having phases differing by 90° from each other to the two coils which are placed at positions deviated by 90° with respect to the rotational angle of the rotor, the rotor 26 can be moved and rotated by the phases of the currents. In addition, by stopping the change of the current phase at a certain timing of the current phase, it is possible to stop the rotor at a position corresponding to the current phase at that point, so that the rotation of the motor 200 is controlled.

The voltages of the current paths to the two coils 22 and 24 are supplied to a comparator 34 via a switch 32. The switch 32 sequentially selects a voltage of a current path supplied to one of the two coils 22 and 24 to be supplied to the comparator 34. Therefore, voltages applied to the coils 22 and 24 are sequentially supplied to the comparator 34. The comparator 34 compares the voltages applied to both terminals of the coils 22 and 24, and generates a signal indicating the comparison result.

The comparator 34 supplies a signal related to the comparison result to a drive current adjusting circuit 36. The drive current adjusting circuit 36 determines an amplitude of current to the motor 200 based on the comparison result by the comparator 34. An adjustment signal related to the current amplitude is supplied to the output control circuit 12. Therefore, the output control circuit 12 generates a drive control signal based on the input signal and the adjustment signal. In addition, an output from an offset generating circuit 38 is connected to one input terminal of the comparator 34. Therefore, with the offset voltage generated from the offset generating circuit 38, an arbitrary offset can be added to the comparison of two inputs. That is, while the output of the comparator 34 is inverted at a boundary where the difference of the voltages on both terminals of the coil 22 or 24 is 0 when the offset is 0, this boundary point may be arbitrarily moved with the offset voltage.

The comparator 34 and the drive current adjusting circuit 36 correspond to an induced voltage detecting unit and the output control circuit 12 and the output circuit 14 correspond to a controlling unit.

Figure 2:
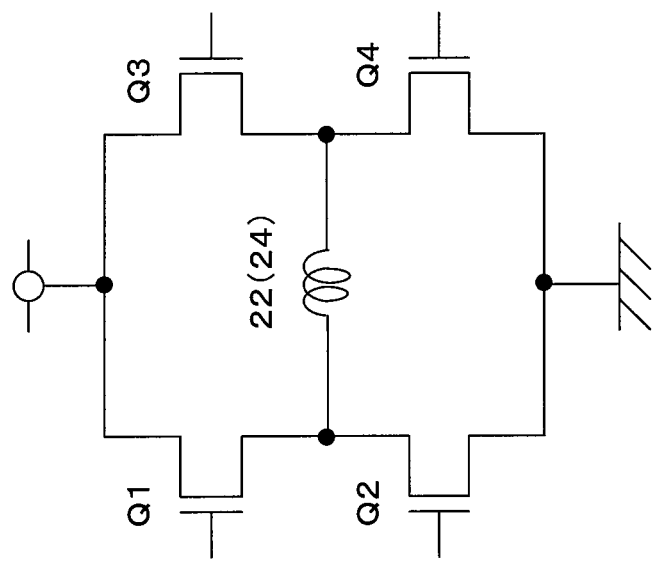
FIG. 2 is a diagram showing a partial structure of an output circuit.

FIG. 2 shows a structure of a part of the output circuit 14 and one of the coils, coil 22 (24), of the motor 200.

As shown in FIG. 2, an arm comprising a serial connection of two transistors Q1 and Q2 and an arm comprising a serial connection of two transistors Q3 and Q4 are provided between a power supply and ground. The coil 22 (24) is connected between an intermediate point of transistors Q1 and Q2 and an intermediate point of transistors Q3 and Q4. When the transistors Q1 and Q4 are switched ON and the transistors Q2 and Q3 are switched OFF, a current in one direction is supplied to the coil 22 (24), and when the transistors Q1 and Q4 are switched OFF and the transistors Q2 and Q3 are switched ON, a current in an opposite direction is supplied to the coil 22 (24), to drive the coils 22 and 24.

By providing two circuits having such a structure, the currents supplied to the two coils 22 and 24 can be individually controlled.

Figure 3:
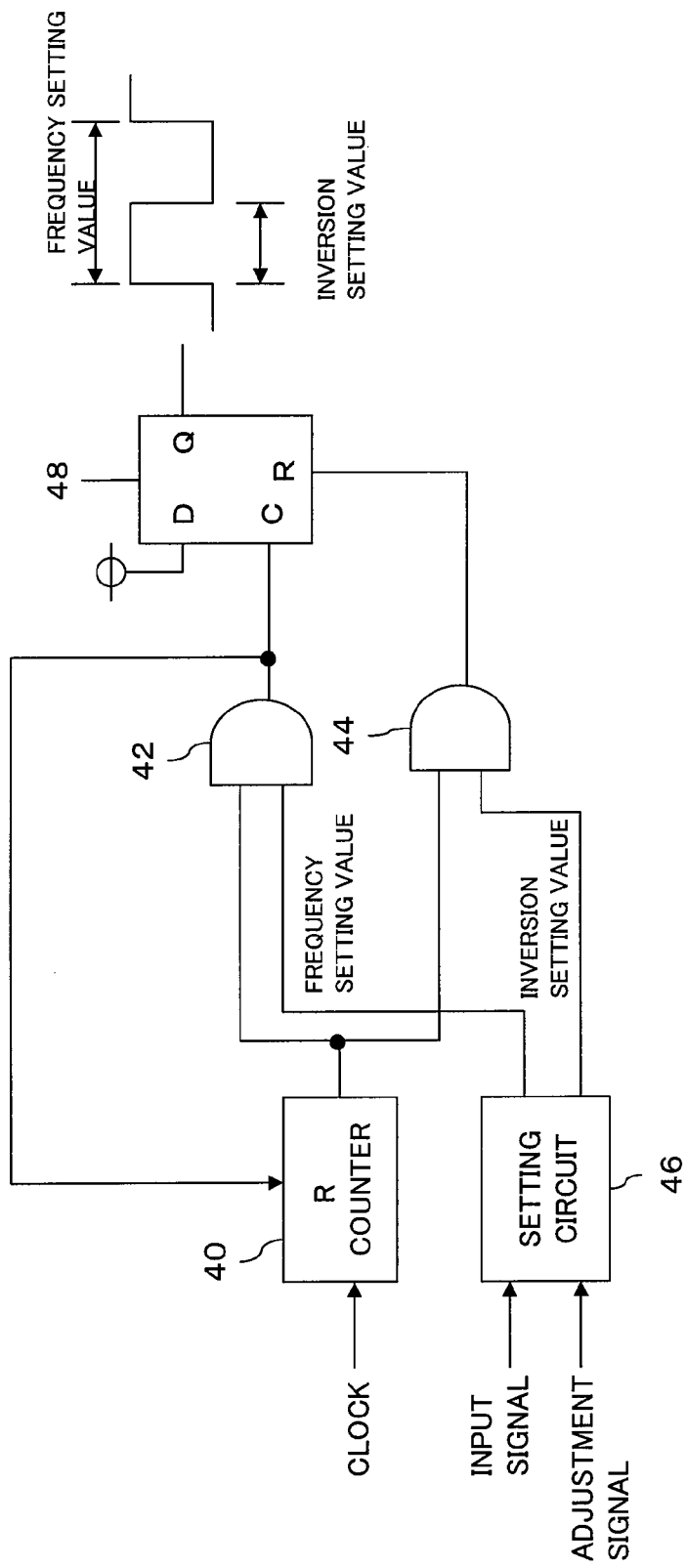
FIG. 3 is a diagram showing a structure of an output control circuit.

FIG. 3 shows a structure of the output control circuit 12. A predetermined clock is supplied to a counter 40, and the counter 40 sequentially counts the clock. A signal of a plurality of bits which is output from the counter 40 is input to two AND circuits 42 and 44. On the other input terminal of the AND circuit 42, a frequency setting value which is indicated by a same number of bits as the output of the counter 40 and which is supplied from a setting circuit 46 is input. Therefore, the AND circuit 42 outputs an H level when the count value of the counter 40 and the frequency setting value match. The output of the AND circuit 42 is connected to a reset terminal of the counter 40. Therefore, the counter 40 counts the clock and is reset by the output of the AND circuit 42 when the count value matches the frequency setting value. In other words, the counter 40 repeats counting to the frequency setting value.

On the other hand, to the other input terminal of the AND circuit 44, an inversion setting value is supplied from the setting circuit 46. Therefore, when the output of the counter 40 becomes the inversion setting value, an H level is output from the AND circuit 44.

The output of the AND circuit 42 is supplied to a clock input terminal C of a flip-flop 48, and the output of the AND circuit 44 is supplied to a reset terminal of the flip-flop 48. A D input terminal of the flip-flop 48 is set to an H level. Therefore, the flip-flop is set to the H level when the value of the counter 40 becomes the frequency setting value, the flip-flop is set to the L level when the value of the counter 40 becomes the inversion setting value, and these processes are repeated. Thus, on the output of the flip-flop 48, a square wave (PWM waveform) having a period determined by the frequency setting value and having the period of H level (duty ratio) determined by the inversion setting value is obtained.

Figure 4:
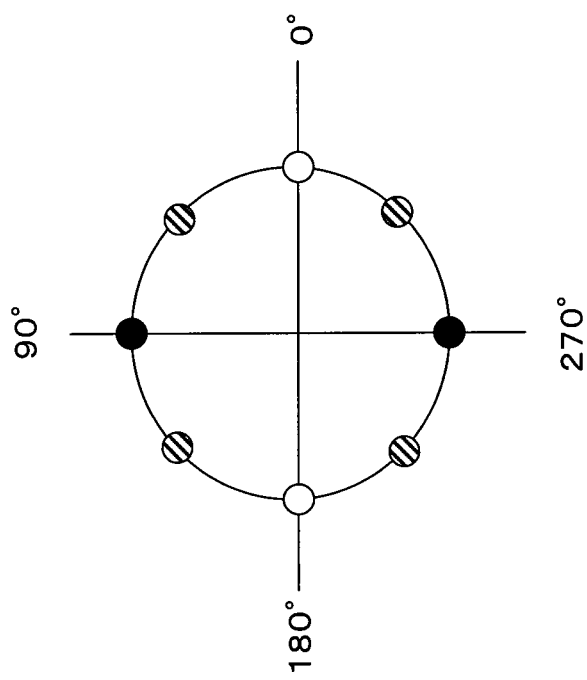
FIG. 4 is a diagram showing a rotational phase.

To the setting circuit 46, the input signal and an adjustment signal from the drive current adjusting circuit 36 are supplied. The input signal is a rotation control instruction of the motor 200, the frequency setting value is determined based on the input signal, and a time period of 1 rotation (rotational speed) is determined. FIG. 4 shows a rotational phase of the motor. The drive current supplied to one coil 22 is 100% at the rotational angles of the rotor represented by electric angle of 0° and 180°, 0% at the rotational angles of the rotor of 90° and 270°, and 71% at the rotational angles of the rotor of 45°, 135°, 225°, and 315°. The phase differs at the other coil 24 by 90°. Therefore, for example, at a 1-2 phase drive (8 phase), the inversion setting value is set to 0, 71, 100, 71, 0, 71, 100, 71, 0 in a system for controlling the drive current of one coil 22, so that the current of one rotation of rotor can be separately controlled in 8 phases. In the case of the second time of appearance of 100, the current to be applied to the coil is in an opposite direction to the case of the first appearance of 100. Similarly, in the cases of the third and fourth appearances of 71, the current to be applied to the coil is in the opposite direction to in the cases of the first and second appearances of 71.

Here, the duty ratio indicates a case of driving with a maximum torque. If the supplied current of the motor 200 is not sufficient, power becomes insufficient, and desired rotational driving cannot be achieved. In the related art, a sufficiently large motor drive current is supplied. Such a driving, however, results in waste of energy.

In the present embodiment, the duty ratio is reduced according to the adjustment signal. For example, the duty ratio is reduced from 71% to 57%, from 100% to 80%, etc. This can be easily achieved by changing the inversion setting value according to the adjustment signal, as described above. The ratios of reduction do not need to be the same ratio.

Figure 5:
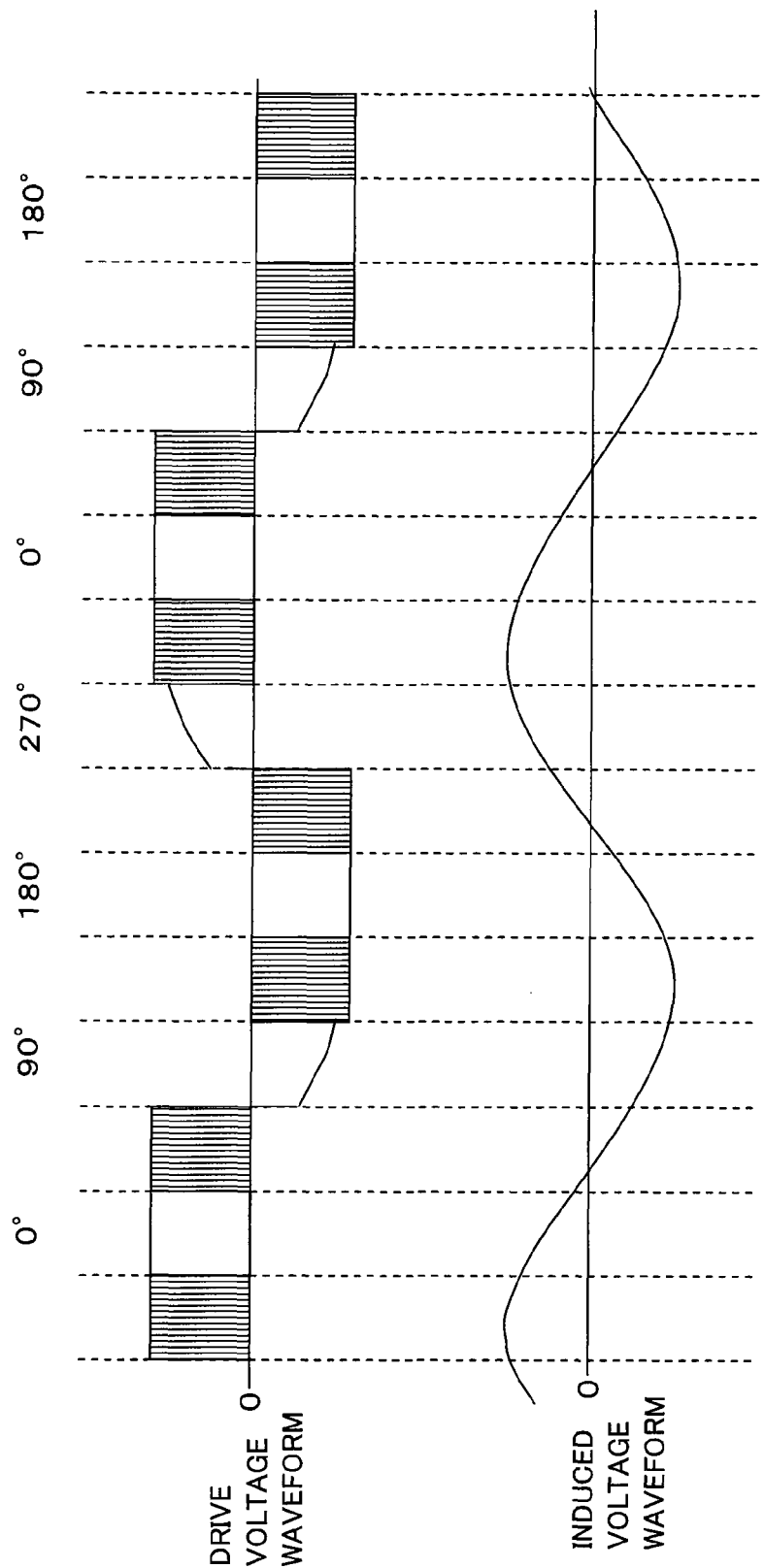
FIG. 5 is a diagram showing a drive voltage waveform and an induced voltage waveform (excessive power)

FIG. 5 shows a drive voltage waveform and an induced voltage waveform in the coil 22 (24) when there is sufficient drive power. The induced voltage waveform does not necessarily become a sine wave, but is shown herein as a waveform close to a sine wave. The drive voltage waveform is a waveform of a potential difference between both terminals of the coil 22 (24). At 90° and 270°, the voltage supply to the coil is 0, all of the transistors Q1~Q4 shown in FIG. 2 are switched OFF, and the coil is in a high-impedance state. Therefore, the induced voltage waveform appears in the coil. The induced voltage waveform has an advanced phase compared to the drive voltage waveform. That is, at the beginning of the high-impedance period, zero is crossed. It can be considered that, because the current flowing in the other coil is sufficiently large, the rotor rotates at an early stage, and the induced voltage waveform as a whole is advanced.

As the duty ratio of the drive voltage is reduced, the induced voltage waveform gradually becomes close to the phase of the drive voltage waveform. Before the loss of synchronization where the predetermined rotation becomes not possible, the induced voltage waveform becomes delayed compared to the drive voltage waveform. At the state of lost synchronization, the rotor does not rotate and the induced voltage waveform cannot be obtained.

Figure 6:
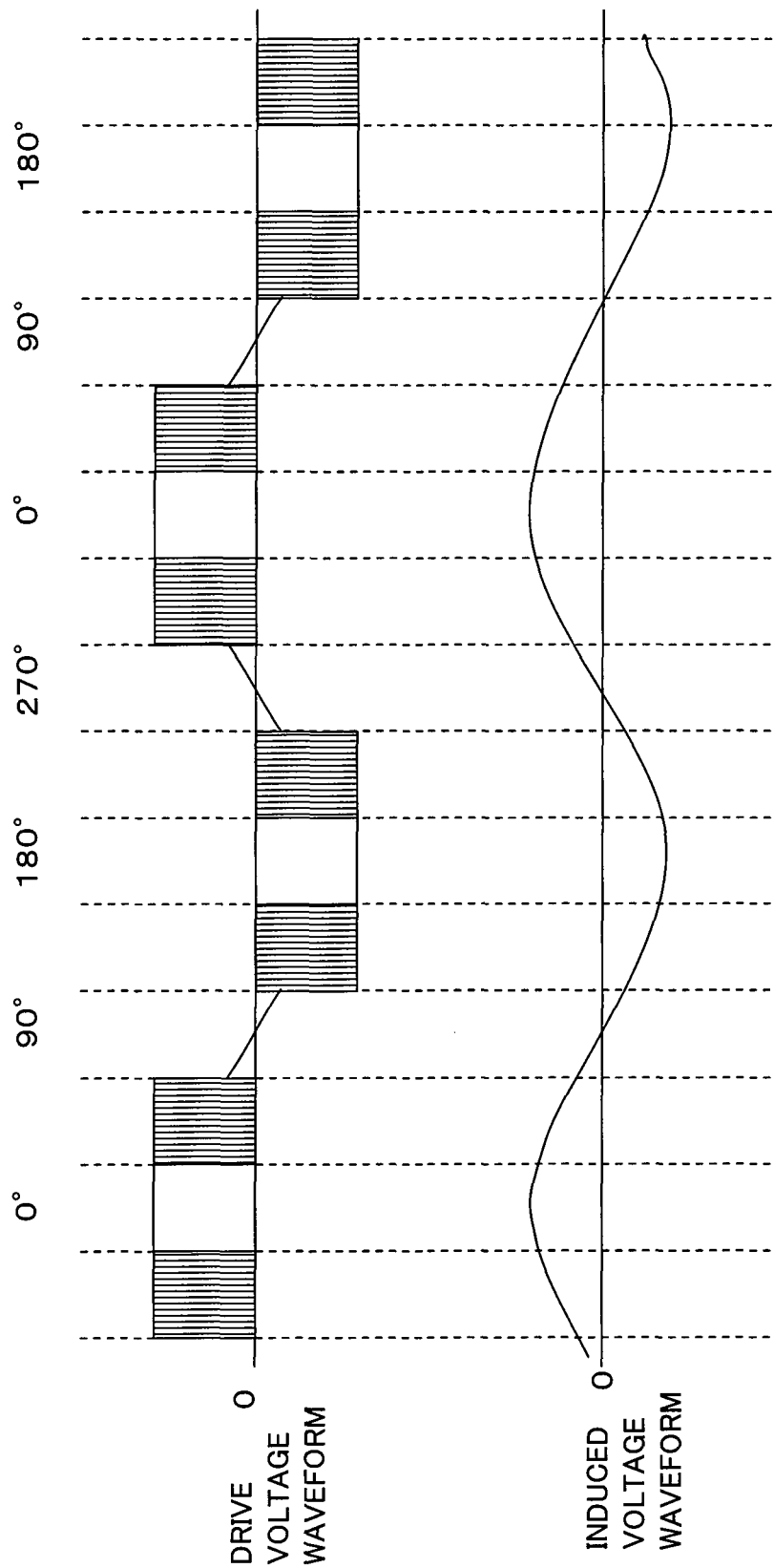
FIG. 6 is a diagram showing a drive voltage waveform and an induced voltage waveform (appropriate power)

FIG. 6 shows a drive voltage waveform and an induced voltage waveform when an appropriate drive current is supplied. As shown in FIG. 6, there is a zero-cross around a center of the high-impedance period.

A configuration where the zero-cross is close to the center of the high-impedance period may be considered as optimum driving. However, the torque necessary for rotation of the motor 200 may change, and in order to avoid loss of synchronization, a certain margin is required. In particular, when the torque change is large, a sufficient margin is required in the drive current.

When a margin is to be provided in the torque of the rotation of the motor 200, it is preferable to apply control so that the phase of the induced voltage waveform is advanced with respect to the phase of the drive current waveform. That is, control is applied such that the zero-cross of the induced voltage waveform is positioned at a position which is advanced compared to a region near the center of the high-impedance period. By applying control so that the phase of the induced voltage waveform is advanced compared to the phase of the drive current waveform, it is possible to reduce the energy consumed in the motor 200 while preventing loss of synchronization of the motor 200.

In the present embodiment, in the switch 32 shown in FIG. 1, the high-impedance period of the coil 22 (24) is selected, and the voltage between both terminals of the coil is supplied to the comparator 34. Therefore, the timing of the zero-cross of the induced voltage can be detected by the timing of inversion of the output of the comparator 34. Although not shown in the drawings, the high-impedance period of the coil 22 (24) is recognized in the output control circuit 12, and the switch 32 may be controlled by a signal from the output control circuit 12, and the drive current adjusting circuit 36 may detect at what timing in the high-impedance period the output of the comparator 34 is inverted.

In addition, with the signal from the offset generating circuit 38, the drive power may be slightly increased or set to an optimum value. In general, the degree of required margin can be determined in advance depending on the usage of the motor 200, and thus the output of the offset generating circuit 38 may be set to a fixed value which is set at a factory. Alternatively, the output of the offset generating circuit 38 may be set variable in order to automatically increase the offset at a later time according to the occurrence of the loss of synchronization, or be set adjustable by the user.

The drive current adjusting circuit 36 preferably outputs an adjustment signal for maintaining the driving when the zero-cross of the induced voltage waveform is within a predetermined period (for example, a period of ±25% of the center of the high-impedance period), and outputs a signal for increasing or decreasing the drive current when the zero-cross is out of this period.

The method of comparison after the offset is added is not limited to the above-described configuration, and other methods may be used. For example, the voltage between both terminals of the coil may be amplified and compared with a variable reference voltage. The reference voltage may be divided from the power supply voltage with resistors, or may be obtained by changing a digital value read from a register into an analog voltage by a DAC. The offset generating circuit 38 may also similarly employ a voltage generating unit.

Alternatively, it is also preferable to sample, at the output of the comparator 34, the zero-cross of only one of a rising direction and a falling direction. The zero-cross position may differ between the rising direction and the falling direction, and thus, by sampling in only one direction, a more stable control may be applied.

As described, according to the present embodiment, the drive power of the motor can be set to an appropriate power, and thus wasteful power consumption can be inhibited. In particular, because the induced voltage is detected and the motor drive power is controlled according to the state of the induced voltage, it is possible to reduce power consumption while preventing the loss of synchronization.

In other words, an appropriate motor drive control according to the rotational drive state of the motor such as the state of motor load, speed, etc. can be executed.

In addition, when the motor is driven with a large power, because the rotor is rotated with a force which is larger than the necessary force, vibrations tend to occur and noise tends to occur. With the present embodiment, the generation of the noise can be inhibited.

Moreover, in this control, a rotation position detecting element of the rotor such as a Hall element is not necessary. Therefore, the cost can be reduced and the number of lines can be reduced. In addition, a further advantage can be obtained in that amounting area for the detecting element is not necessary. Moreover, because there is no Hall element, the device is durable against high temperature, and loss of the drive current during detection does not occur.

As the method of driving the driver, in addition to the method of setting the output to high impedance when no motor current is applied, there is another method of fixing the output to 0 V. Specifically, when the output is set to high impedance, the transistors Q1~Q4 of FIG. 2 are switched OFF, but in the method of setting the output to 0 V, the transistors Q1 and Q3 are switched OFF and the transistors Q2 and Q4 are switched ON, to fix both terminals of the coil 22 (24) at 0 V.

When the output is set to 0 V, the induced voltage waveform cannot be detected. In addition, in a two-phase magnetization drive, there is no high-impedance period in which the induced voltage can be detected. Therefore, in these cases, a high-impedance period is suitably inserted within a range where the driving is not affected, and the induced voltage waveform is detected in the high-impedance period.

Next, another preferred embodiment of the present invention will be described with reference to drawings. The preferred embodiment of the present invention to be described below differs from the above-described preferred embodiment of the present invention in the structure of the circuit which compares the voltages applied to both terminals of the coils 22 and 24. More specifically, a drive current adjusting circuit 70 compares the voltages applied between both terminals of the coils 22 and 24. The circuits which are assigned the same reference numerals as in the above-described preferred embodiment have structures and operations similar to the corresponding circuits in the above-described preferred embodiment, and thus will not be described again.

[Overall Structure]

Figure 7:
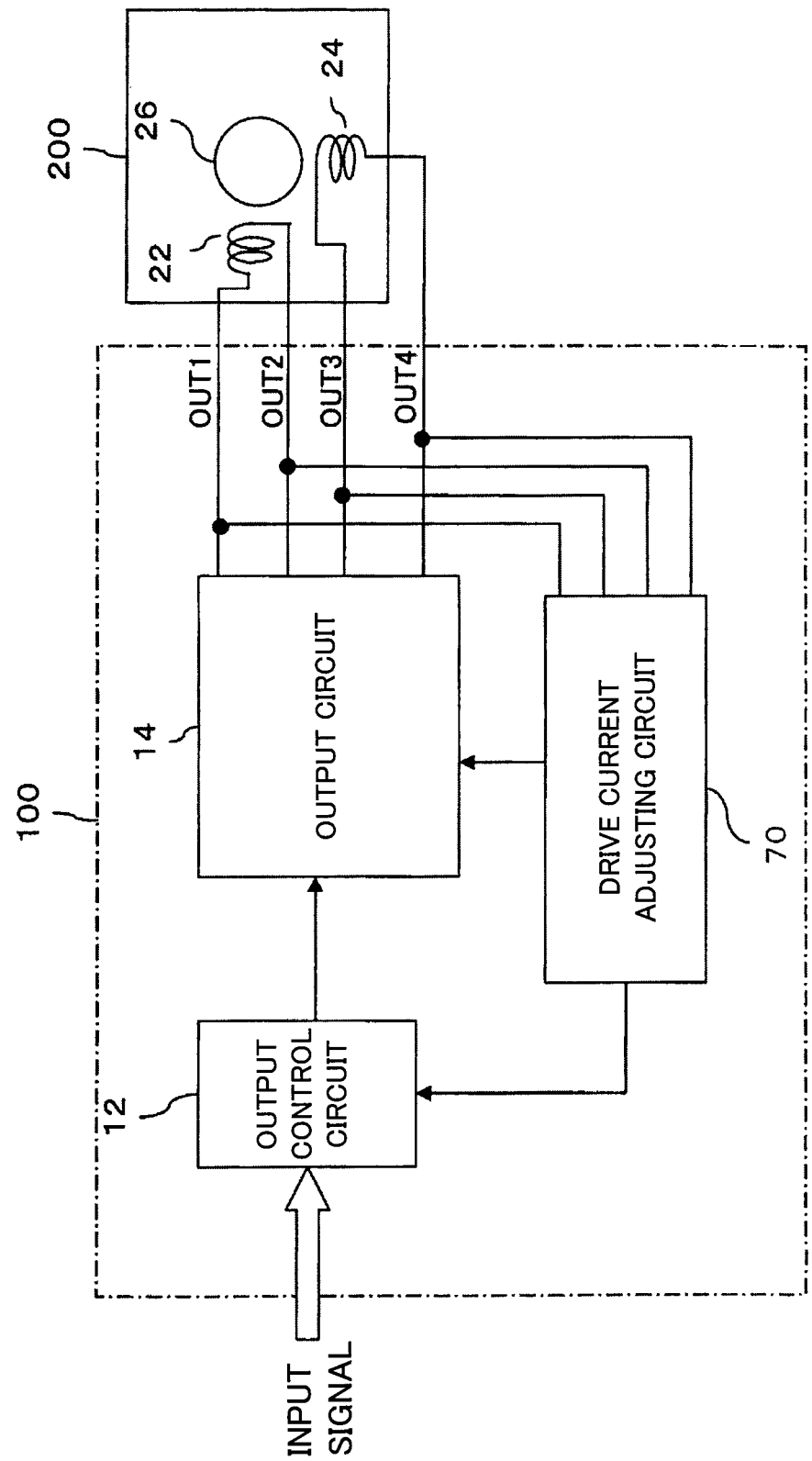
FIG. 7 is a diagram showing an overall structure of a system including a driver circuit according to another preferred embodiment of the present invention.

FIG. 7 is a diagram showing an overall structure of a system, which comprises the driver 100 and the motor 200. Other than the drive current adjusting circuit 70, the structure is identical to the above-described preferred embodiment of the present invention.

Voltages of outputs OUT1~OUT4 of four current paths to two coils 22 and 24 are supplied to the drive current adjusting circuit 70. The drive current adjusting circuit 70 determines the amplitude of the current to the motor 200 based on the voltages of the outputs OUT1~OUT4. The drive current adjusting circuit 70 supplies an adjustment signal related to the amplitude of the current to the output control circuit 12. Therefore, the output control circuit 12 generates a drive control signal based on the input signal and the adjustment signal. The drive current adjusting circuit 70 corresponds to an induced voltage detecting unit.

[Structure of Drive Current Adjusting Circuit]

Figure 8:
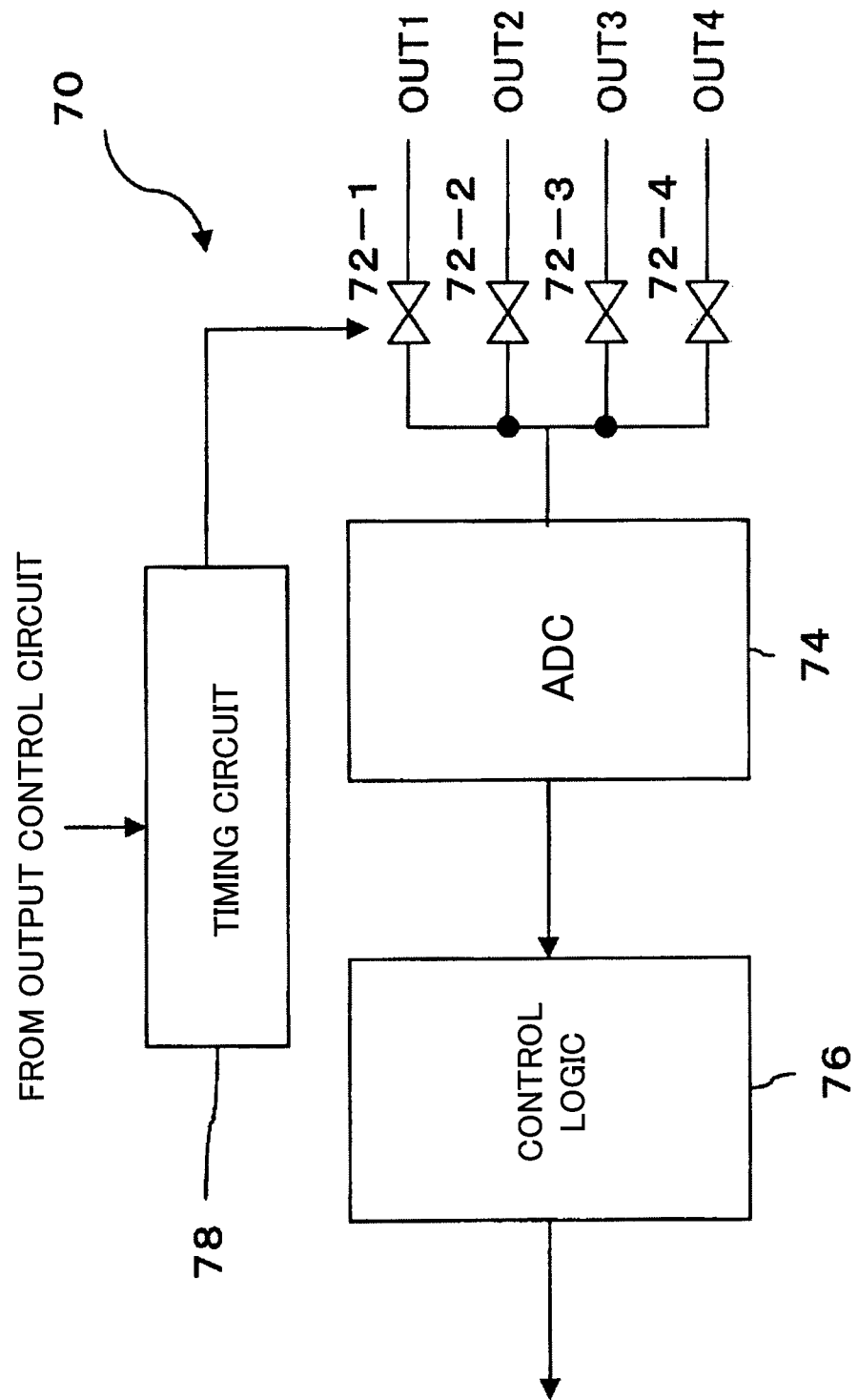
FIG. 8 is a diagram showing a structure of a drive current adjusting circuit.

An example structure of the drive current adjusting circuit 70 is shown in FIG. 8. The voltages of OUT1~OUT4 are input to the ADC 74 through four switches 72, respectively. The ADC 74 converts the input voltage which is selected by the switch 72 into a digital signal and sequentially outputs the digital signal. The output of the ADC 74 is supplied to control logic 76. The control logic 76 determines the amplitude of current to the motor 200 based on the supplied voltage waveforms of OUT1~OUT4, and supplies an adjustment signal related to the amplitude of the current to the output control circuit 12.

The output control circuit 12 generates a drive control signal in the PWM control according to the adjustment signal. The PWM control methods include a direct PWM control method and a constant current shopping method.

In the case of the direct PWM control method, the PWM control is applied assuming that the duty ratio of the square wave and the current output are proportional to each other. In this case, if an induced voltage occurs in the motor, the actual current output value is reduced. In the direct PWM control method, the current output value can be adjusted by controlling the duty ratio of the square wave to be targeted and the coefficient for adjusting the amplitude of the square wave.

In the case of the constant current chopping method, on the other hand, control is applied to detect the current for driving the motor by detecting a current flowing between a power supply and ground, and to change the pulse width of the square wave so that the detected current is at a target value. In the constant current chopping method, the current output value can be adjusted by changing the target value.

In the present embodiment, a driver circuit will be described which employs the direct PWM control method.

In the present embodiment, the output voltages OUT1~OUT4 to the four coil terminals are directly AD-converted by the ADC 74.

For this purpose, the driver circuit comprises a timing circuit 78. The timing circuit 78 controls switching of the switch 72 based on the driving phases of the coils, and controls switching of the transistors Q2 and Q4 in the output circuit 14. In other words, in the coil 22 (24), one of the terminals OUT is connected to the ground and the other terminal OUT is open. In this manner, an induced voltage occurs in the terminal OUT of the open side. The induced voltage is input to the ADC 74, and the ADC 74 outputs a digital value which indicates the amplitude.

As described above, the output circuit for one coil 22 (24) has a structure as shown in FIG. 2. In the driving of one coil 22 (24), a state where the transistor Q1 is PWM-controlled while the transistor Q4 is switched ON, and a state where the transistor Q3 is PWM-controlled while the transistor Q2 is switched ON, are repeated.

Figure 9:
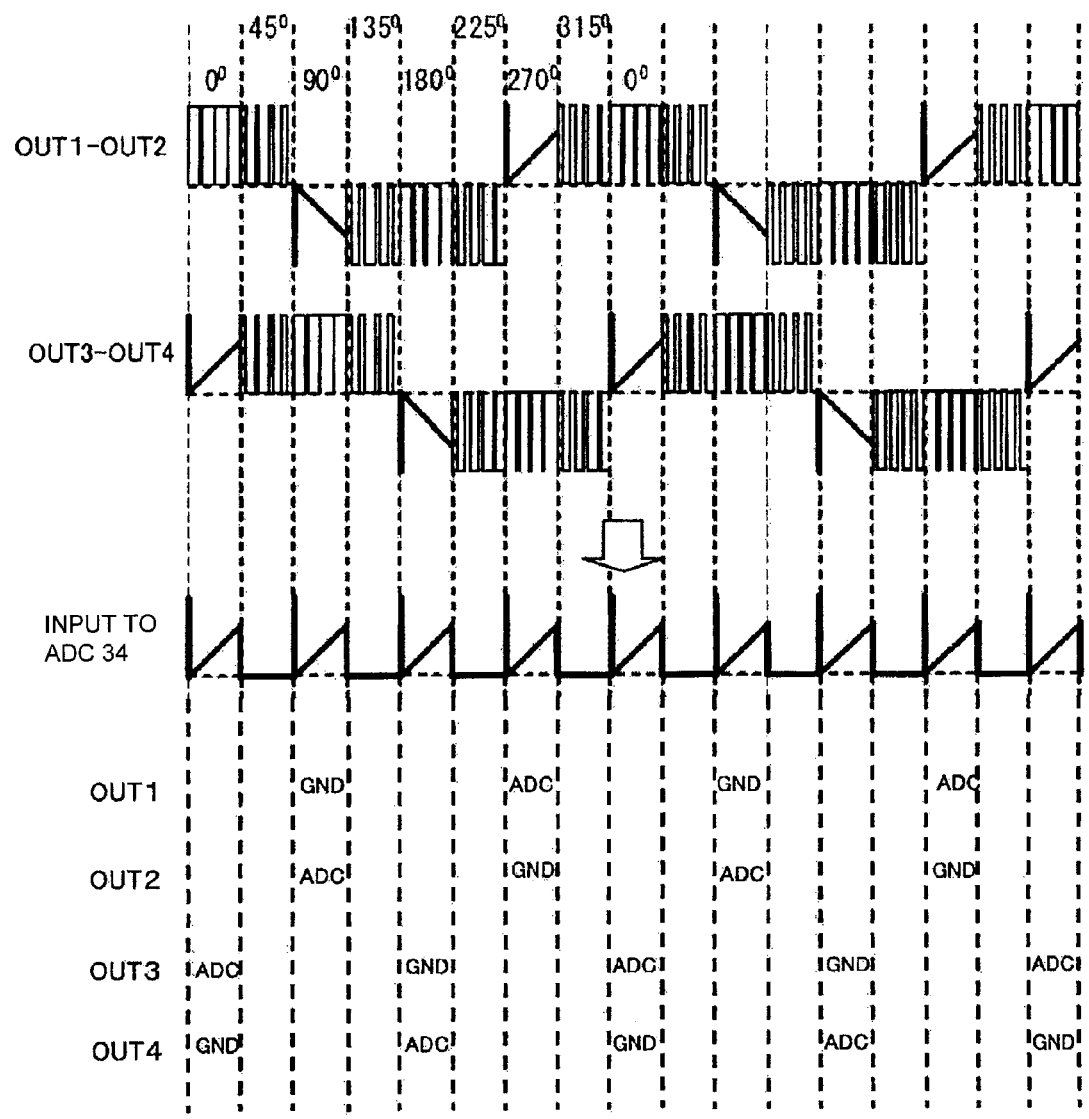
FIG. 9 is a diagram showing an output and a control state of an output circuit.

FIG. 9 shows a voltage waveform between OUT1 and OUT2 for applying the drive voltage to the coil 22, and a voltage waveform between OUT3 and OUT4 for applying the drive voltage to the coil 24. As shown in FIG. 9, the drive waveforms to the two coils 22 and 24 differ in phase by 90°, and the drive waveform of the coil 22 is advanced by 90° compared to the drive waveform of the coil 24.

In the example voltage waveform between OUT3 and OUT4, when the state transitions from the state where the transistor Q1 is PWM-controlled while the transistor Q4 is switched ON to the state where the transistor Q3 is PWM-controlled, while the transistor Q2 is switched ON as shown in FIG. 2, that is, in the step (phase) of 180° of the drive waveform, and when the state transitions from the state where the transistor Q3 is PWM-controlled while the transistor Q2 is switched ON to the state where the transistor Q1 is PWM-controlled while the transistor Q4 is switched ON, that is, in the step of 0° of the drive waveform, an induced voltage is detected.

In other words, in this period, the transistors Q1 and Q3 are maintained in the OFF state, and the transistor Q2 (or Q4) to be switched ON at the next phase is switched ON. The transistor Q4 (or Q2) is maintained in the OFF state.

In the example shown in FIG. 9, in a region near the electric angle of 0°, the OUT1-OUT2 corresponding to the coil 22 is in a state where the transistor Q4 is switched ON and the transistor Q1 is PWM-controlled. In the step (phase) of the electric angle of 90°, the transistor Q2 is switched ON, OUT1 is connected to ground GND, and the transistors Q1, Q3, and Q4 are switched OFF, to set OUT2 to the open state. With this process, the induced voltage in the coil 22 is obtained at OUT2, and, when the switch 72-2 is switched ON, the induced voltage is input to the ADC 74. In the step of the electrical angle of 270°, the transistor Q4 is switched ON, OUT2 is connected to the ground GND, and the transistors Q1, Q2, and Q3 are switched OFF, to set OUT1 to the open state. With this process, the induced voltage in the coil 22 is obtained at OUT1, and when the switch 72-1 is switched ON, the induced voltage is input to the ADC 74. Because the coil 24 has the phase delayed by 90°, at the electrical angle of 0°, OUT3 is open, OUT4 is connected to ground, the switch 72-3 is switched ON, and the induced voltage of OUT3 is supplied to the ADC 74. At the electrical angle of 180°, OUT4 is open, OUT3 is connected to ground, the switch 72-4 is switched ON, and the induced voltage of OUT4 is supplied to the ADC 74.

The control of the switching of the transistors Q1~Q4 and switch 72 at the output circuit 14 for the coils 22 and 24 for measurement of the induced voltage is executed by the timing circuit 78 based on a signal of a switching phase from the output control circuit 12.

The induced voltage of the coil 22 (24) is determined as a difference in voltage between both terminals. However, in the present embodiment, because one terminal of the coil 22 (24) is connected to ground when the induced voltage is measured, the value of the potential difference between both terminals of the coil 22 (24) is directly obtained at the other terminal of the coil 22 (24) which is in the open state. Therefore, it is not necessary to detect the potential difference between both terminals of the coil with an operational amplifier, and the circuit can be simplified. In addition, OUT on the open side is the terminal on the side where the induced voltage is increased, and thus the input to the ADC 74 is basically a positive voltage, and can be converted to the digital signal at the ADC 74, without further processing.

In this manner, the induced voltage at the phase where the drive current waveform becomes 0 can be sequentially detected by the ADC 74. Therefore, in two coils 22 and 24, at one period of the electrical angle of the motor, detection can be executed four times. The detection period of the induced voltage is ⅛ period in 1-2 phase magnetization mode employed in the present embodiment and 1/16 period in W1-2 phase magnetization mode.

Figure 10:
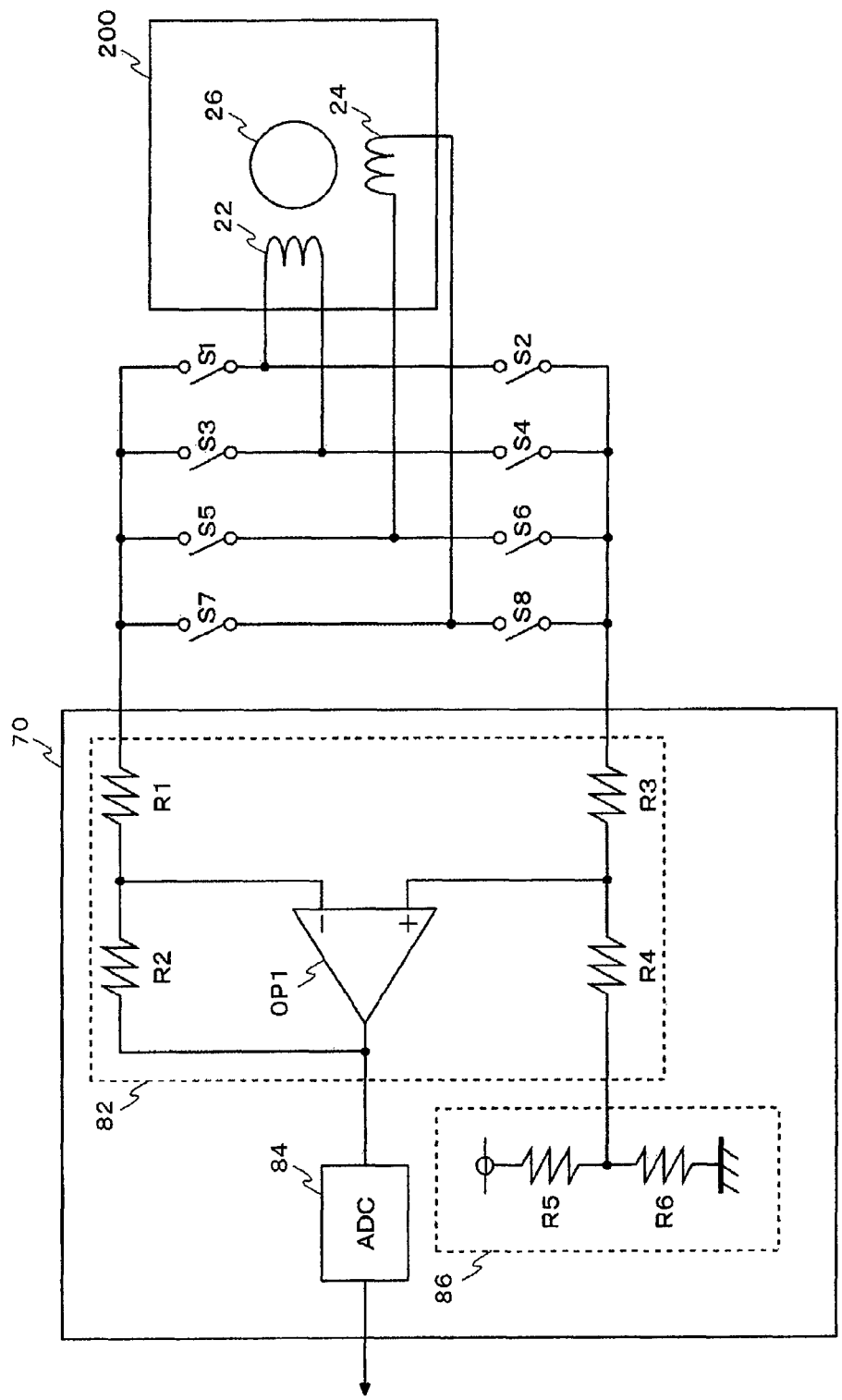
FIG. 10 is a diagram showing a structure of a drive current adjusting circuit.

FIG. 10 shows another example structure of the drive current adjusting circuit 70. The drive current adjusting circuit 70 comprises a differential amplifier circuit 82, an ADC 84, and an offset generating circuit 86. The differential amplifier circuit 82 differentially amplifies the potential between both terminals of the coil 22 or coil 24 and outputs to the ADC 84. The ADC 84 converts the analog value which is output from the differential amplifier circuit 82 into a digital value and outputs to the output control circuit 12.

A specific structure of the differential amplifier circuit 82 will now be described. The differential amplifier circuit 82 comprises an operational amplifier OP1, a first resistor R1, a second resistor R2, a third resistor R3, and a fourth resistor R4.

A potential of one terminal of the coil 22 or coil 24 is input via the first resistor R1 to an inverted input terminal of the operational amplifier OP1. The inverted input terminal and an output terminal of the operational amplifier OP1 are connected via the second resistor R2. The first resistor R1 and the second resistor R2 are connected in series.

A potential on one terminal of the coil 22 or the coil 24 is input via the third resistor R3 to a non-inverted input terminal of the operational amplifier OP1. The non-inverted input terminal of the operational amplifier OP1 is connected to the offset generating circuit 86 via the fourth resistor R4. The third resistor R3 and the fourth resistor R4 are connected in series. When the offset generating circuit 86 is not provided, the fourth resistor R4 is connected to ground in place of the offset generating circuit 86.

The resistance values of the first resistor R1 and the resistance value of the third resistor R3 are set to the same value, and the resistance value of the second resistor R2 and the resistance value of the fourth resistor R4 are set to the same value. Under such conditions, the amplification of the differential amplifier circuit 82 is determined by R2/R1. The designer or the user can adjust the amplification of the differential amplifier circuit 82 by adjusting the resistance values of the first resistor R1 (which is equal to the resistance value of the third resistor R3) and the second resistor R2 (which is equal to the resistance value of the fourth resistor R4).

The offset generating circuit 86 comprises a fifth resistor R5 and a sixth resistor R6. The fifth resistor R5 and the sixth resistor R6 are connected in series, and the series-connected circuit is connected between the power supply and the ground. A voltage dividing point between the fifth resistor R5 and the sixth resistor R6 is connected to the fourth resistor R4. The designer or the user can adjust the resistance values of the fifth resistor R5 and the sixth resistor R6, to adjust a voltage dividing ratio between the fifth resistor R5 and the sixth resistor R6, and adjust the offset voltage to be applied to the differential amplifier circuit 82.

A first switch S1 is a switch for connecting or disconnecting the first terminal of the coil 22 and the inverted input terminal of the differential amplifier circuit 82. A second switch S2 is a switch for connecting or disconnecting the first terminal of the coil 22 and the non-inverted input terminal of the differential amplifier circuit 82. A third switch S3 is a switch for connecting or disconnecting the second terminal of the coil 22 and the inverted input terminal of the differential amplifier circuit 82. A fourth switch S4 is a switch for connecting or disconnecting the second terminal of the coil 22 and the non-inverted input terminal of the differential amplifier circuit 82.

A fifth switch S5 is a switch for connecting or disconnecting the first terminal of the coil 24 and the inverted input terminal of the differential amplifier circuit 82. A sixth switch S6 is a switch for connecting or disconnecting the first terminal of the coil 24 and the non-inverted input terminal of the differential amplifier circuit 82. A seventh switch S7 is a switch for connecting or disconnecting the second terminal of the coil 24 and the inverted input terminal of the differential amplifier circuit 82. An eighth switch S8 is a switch for connecting or disconnecting the second terminal of the coil 24 and the non-inverted input terminal of the differential amplifier circuit 82.

When the induced voltage of the coil 22 is detected, a first state where the first switch S1 is switched ON, the second switch is switched OFF, the third switch is switched OFF, and the fourth switch S4 is switched ON, and a second state where the first switch S1 is switched OFF, the second switch S2 is switched ON, the third switch S3 is switched ON, and the fourth switch S4 is switched OFF are alternately switched for the phases in which the output circuit 14 is controlled in the high-impedance state with respect to the coil 22.

When the induced voltage of the coil 24 is detected, a third state where the fifth switch S5 is switched ON, the sixth switch S6 is switched OFF, the seventh switch S7 is switched OFF, and the eighth switch S8 is switched ON, and a fourth state where the switch S5 is switched OFF, the sixth switch S6 is switched ON, the seventh switch S7 is switched ON, and the eighth switch S8 is switched OFF are alternately switched for phases in which the output circuit 14 is controlled to be in the high-impedance state with respect to the coil 24.

In this control method, the polarity of the output voltage of the operational amplifier OP1 can be unified to, for example, positive, regardless of whether the induced voltage is changing in a rising direction or in a falling direction, with the boundary at zero. Therefore, the output voltage range of the operational amplifier OP1 and the input voltage range of the ADC 84 can be narrowed, and the increase in the cost of the operational amplifier OP1 and the ADC 84 can be inhibited. Because the polarity of the induced voltage is alternately switched for phases of control to the high-impedance state, polarity information can be easily added to the output digital value of the ADC 84, at downstream of the ADC 84.

When the polarity of the output voltage of the operational amplifier OP1 is not to be unified, the second switch S2, the third switch S3, the sixth switch S6, and the seventh switch S7 do not need to be provided. In this configuration also, by executing the sampling of the induced voltage at every other phase, it is possible to unify the polarity. However, the convergence time is slowed compared to the case where the induced voltage is sampled at every phase.

In addition, it is possible to precisely detect the induced voltage by constructing the drive current adjusting circuit 70 with the differential amplifier circuit and the analog-to-digital converter circuit. More specifically, in the stepping motor which is driven with a low voltage, the induced voltage also has a small value. In such a case also, the potential between both terminals of the coil may be input to the two input terminals of the differential amplifier circuit and may be differentially amplified, so that the induced voltage can be precisely detected. In addition, when the detection result is converted to the digital value, a feedback control by the digital value is enabled, and thus the correction precision can be improved.

[Timing of Detecting Induced Voltage]

As described above, according to the preferred embodiments, an induced voltage generated during the period in which the coil is in the high-impedance state is detected, and the motor drive current is controlled based on the detected value. As shown in FIG. 1, the motor 200 comprises two coils 22 and 24. When one of the coils 22 (24) is high impedance, the other coil 24 (22) is driven with a relatively high duty ratio.

Therefore, the induce voltage generated in the one coil 22 (24) is affected by the other coil 24 (22), in particular, a change of current by PWM. Therefore, it is preferable to detect the induced voltage at a timing where there is no influence of the other coil 24 (22).

Figure 11:
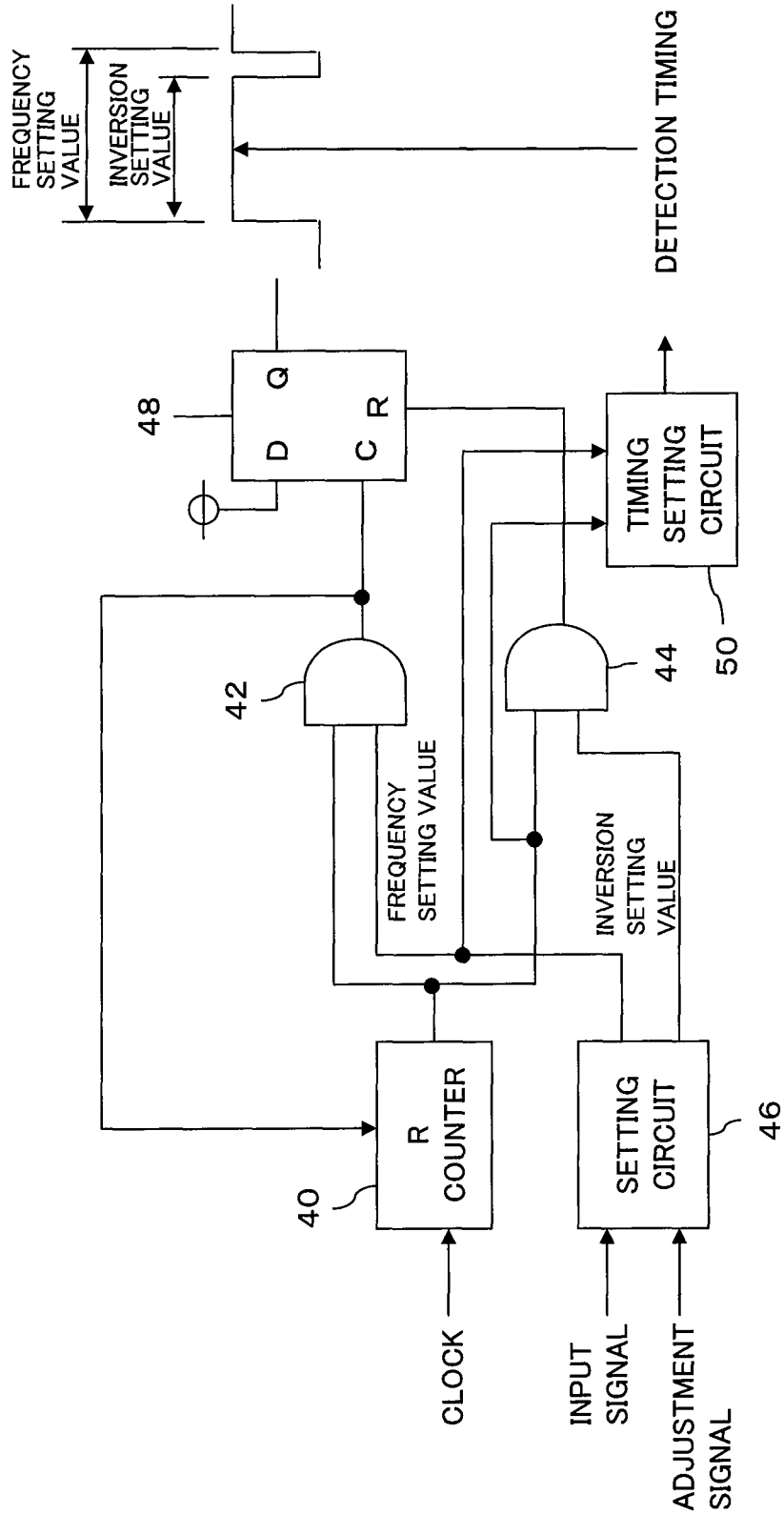
FIG. 11 is a diagram showing another example structure of the output control circuit.

FIG. 11 shows an example configuration for such a purpose. The frequency setting value from the setting circuit 46 and the output of the counter 40 are supplied to a timing setting circuit 50. The timing setting circuit 50 generates a timing, within one period, in which the influence of the other coil 24 (22) is not significant (timing of low noise), and supplies a timing signal to the drive current adjusting circuit 36 of FIG. 1. At the drive current adjusting circuit 36, the induced voltage is sampled based on the timing signal, and an adjustment signal is generated based on the induced voltage. Because of this configuration, an accurate induced voltage can be detected.

Figure 12:
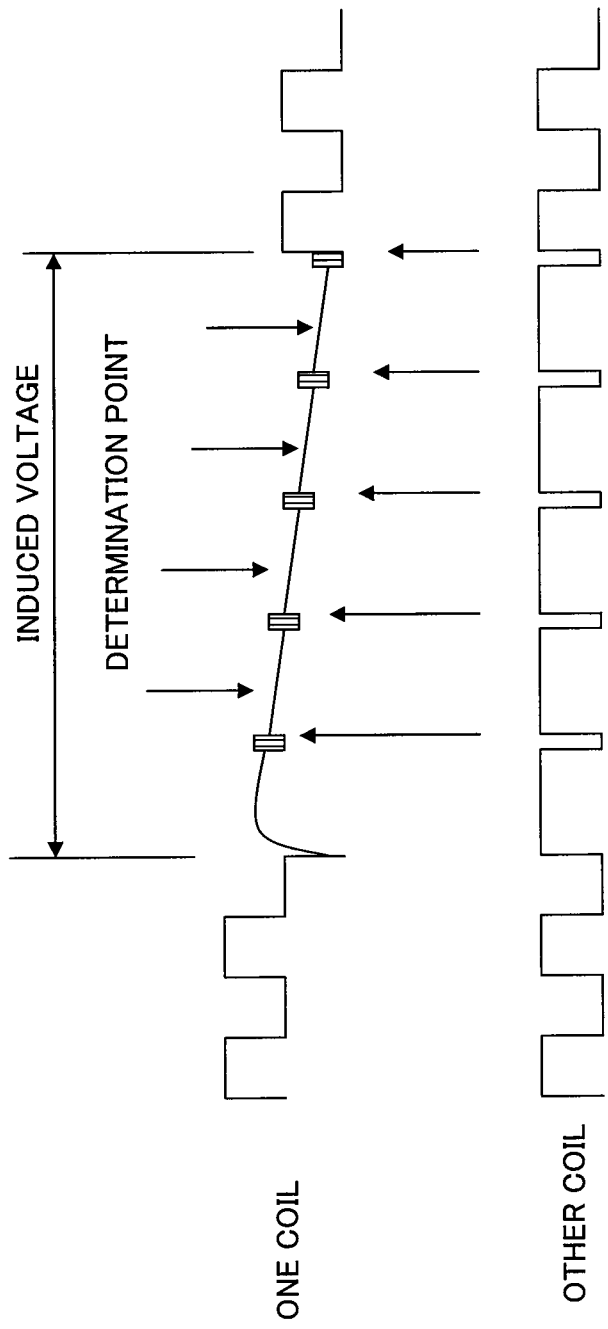
FIG. 12 is a diagram for explaining a sampling timing of the induced voltage.

FIG. 12 shows voltage between both terminals of two coils. When one coil 22 (24) is high impedance, the other coil 24 (22) is in a drive state with a large duty ratio. Due to a voltage change in the other coil 24 (22), noise is added to the induced voltage. Thus, by detecting the induced voltage avoiding this period, the influence of the noise due to the current change of the other coil 24 (22) can be eliminated. More specifically, the output control circuit 12 generates PWM waveforms of the two coils 22 and 24, and has data regarding the conversion timing of the PWM waveform. Thus, in the timing setting circuit 50, a point where the signal of the other coil 24 (22) does not change is set as the sampling timing, and the induced voltage is sampled specifying a timing where the voltage of the other coil 24 (22) is a constant, once every period of the PWM waveform, for example. Based on the change of the sampled induced voltage, it is possible to judge whether or not the zero-cross point of the induced voltage is within a predetermined range.

Figure 13:
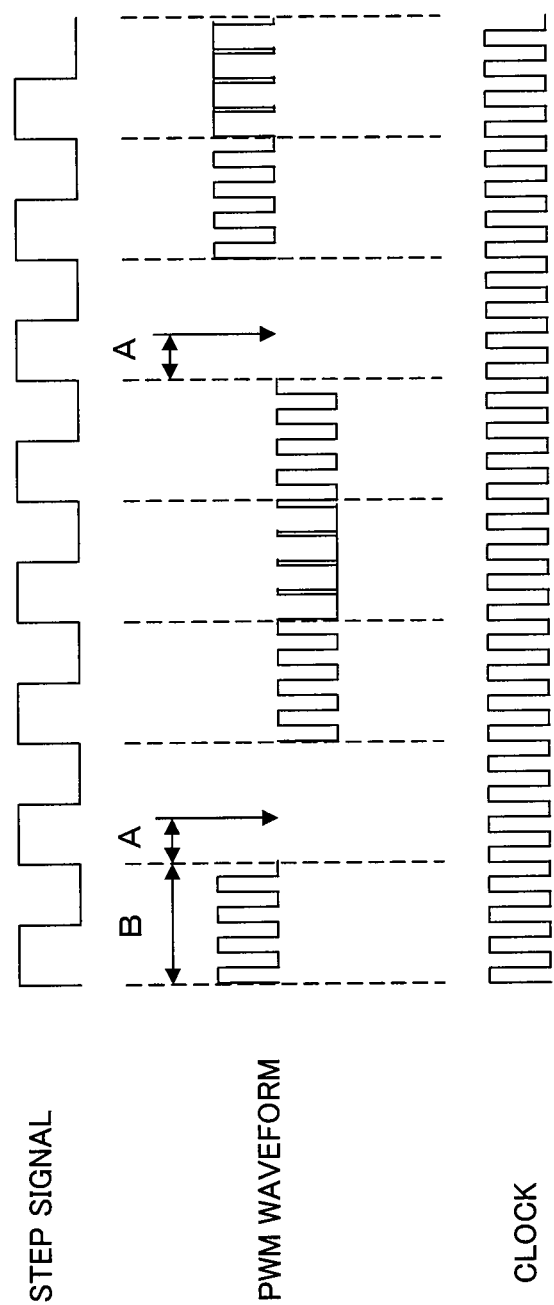
FIG. 13 is a diagram showing a relationship between a PWM waveform and a zero-cross position.

FIG. 13 shows a PWM waveform for driving the one coil 22 (24) and a clock forming a basis for generating a step signal and PWM waveform.

The step signal is a signal related to the rotation of the motor, and is a square wave having a duty ratio of 50%. With the step signal, one rotation (360°) of the electrical angle is recognized. One mechanical rotation of the motor varies depending on the number of poles.

In the circuit of FIG. 11, in order for the counter 40 to output a count value of the clock, a certain count value is set as a sampling timing at the timing setting circuit 50, so that an appropriate sampling timing can be set.

With regard to a period around the center in one phase (high impedance period), in FIG. 13, a length of one phase is shown as B and a length from start of one phase to a point where the zero-cross is determined is shown as A. When the margin of the motor drive current is the same, the ratio A/B is preferably controlled to be constant regardless of the rotational speed.

In addition, a value of the induced voltage when the ratio A/B is constant may be detected, and the motor drive current may be controlled by the fact that the detected value (voltage value) is around 0, that is, the detected value is within a predetermined range with respect to 0. In this case, the detection of induced voltage may be once per high-impedance period.

[Determination in Consideration of Mechanical Angle]

Figure 14:
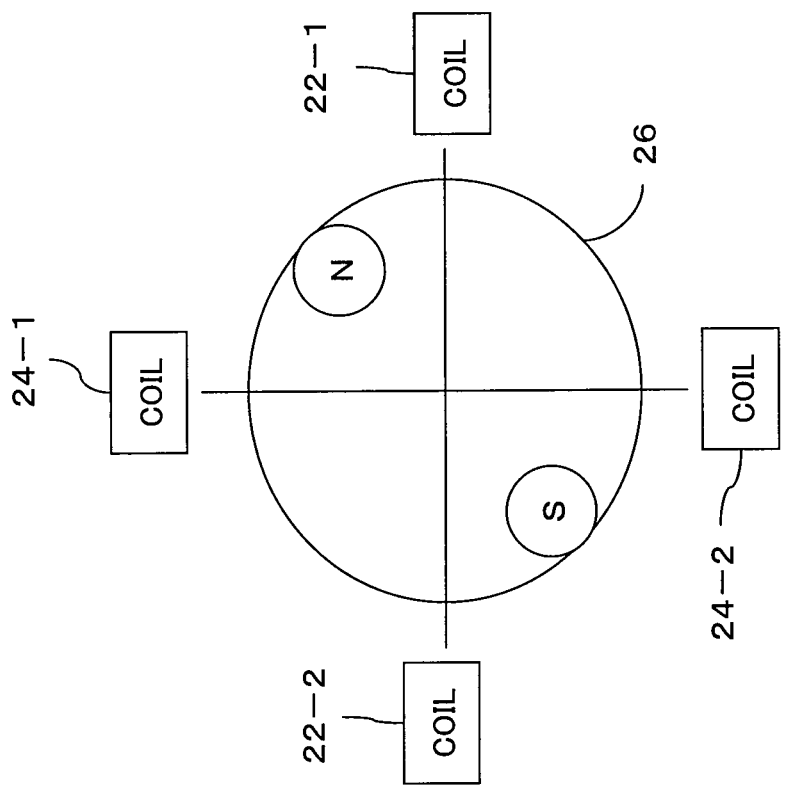
FIG. 14 is a diagram showing an example method of driving a motor.

FIG. 14 shows an example configuration of two poles in which the rotor has one N pole and one S pole, which are driven by four coils 22-1, 22-2, 24-1, and 24-2. The coils 22-1 and 22-2 and the coils 24-1 and 24-2 on the stator side apply currents of phases which differ from each other by 180°. In addition, the phases of coils 22-1 and 22-2 and the coils 24-1 and 24-2 differ from each other by 90°. Therefore, this configuration is similar to the above-described configuration in that one period corresponds to one rotation of the motor. With such a configuration, a rotation of the rotor 26 as described above can be realized.

Figure 15:
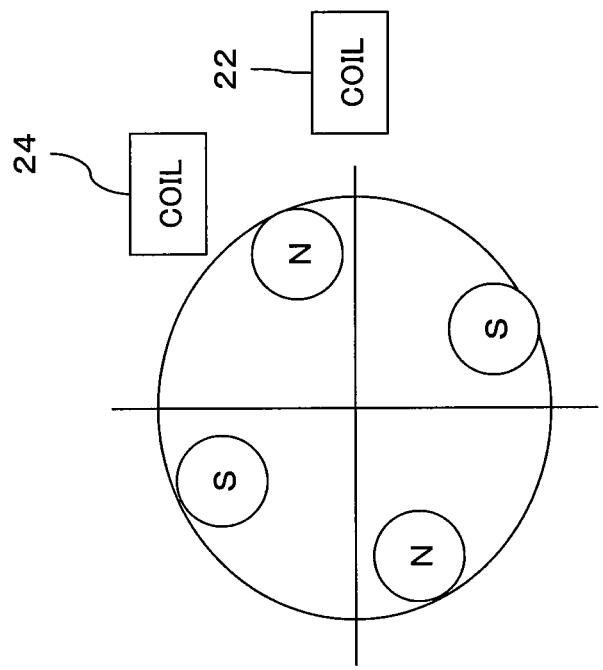
FIG. 15 is a diagram showing another example method of driving a motor.

FIG. 15 shows a configuration where the rotor has four poles and the mechanical angles of the coils 22 and 24 are shifted by 45°. When the structure is to be driven as described above, it is preferable to provide coils having current phases differing by 180°, and to provide a total of 8 stator coils. When currents having phases differing by 90° are supplied to adjacent coils 22 and 24, the electrical phase of 360° corresponds to 180° of rotation of the rotor 26. In this manner, by changing the number of poles of the motor, the mechanical (rotor) rotation angle corresponding to one rotation of the electrical angle can be changed.

As described, one period of the electrical angle does not correspond to one period of the mechanical angle, and one period of the electrical angle may correspond to ¼ of the rotation angle of the rotor. In such a case, even with the induced voltage at a constant electrical angle, the induced voltage may be detected at positions of different mechanical angles. If the mechanical angle differs, the induced voltage may change based on the mechanical structure of the motor.

The relationship between the mechanical angle and the electrical angle is uniquely determined depending on the motor. For example, when the mechanical angle of 360° corresponds to the electrical angle of 4×360°, the induced voltages corresponding to 1440° of the electrical angle may be measured, and the zero-cross point can be accurately determined by an average value of the measurement results or the like.

Alternatively, it is also possible to sample only the detected value at the same mechanical angle, and detect the zero-cross point based on the sampled detected values. In this case also, the zero-cross may be detected based on measurement results of the induced voltage at points where the mechanical angle differs by 360°.

Figure 16:
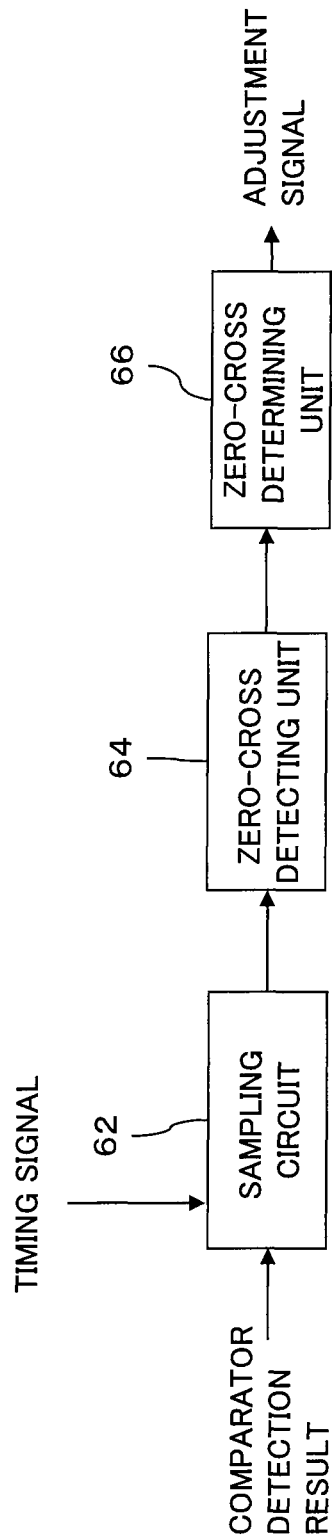
FIG. 16 is a diagram showing a structure for detecting zero-cross, in consideration of a mechanical angle.

FIG. 16 shows a structure of such a preferred embodiment. The voltage between both terminals of the coil which is the comparison result of the comparator 34 is input to a sampling circuit 62. As described above, a timing signal indicating a timing in the PWM waveform where there is no noise is supplied to the sampling circuit 62. The sampling circuit 62 samples the induced voltage at this timing, and supplies the sampled induced voltage to a zero-cross detecting unit 64. The zero-cross detecting unit 64 determines a zero-cross point where the positive and negative are inverted based on the supplied values of induced voltages. The determination is made, for example, by determining whether or not two adjacent detected voltages, in which positive and negative are inverted, are within a set region near the center. Whether the electrical phase is delayed or advanced can be determined based on the change state of the drive voltage to the coil and whether the detected zero-cross point position or detected induced voltage is positive or negative.

When the zero-cross for the induced voltage in one high-impedance period is detected in this manner, the detection result is supplied to a zero-cross determining unit 66. The zero-cross determining unit 66 stores zero-cross detection results for one period of the mechanical angle (360°), and averages the zero-cross detection results, to obtain an average zero-cross detection result for one period of mechanical angle. Based on the average result, the zero-cross determining unit 66 determines whether or not the amount of drive current is to be changed, and generates and outputs the adjustment signal. In this example configuration, an average for one period of the mechanical angle is calculated, but the average does not need to be an average of one period, and may be, for example, an average for two periods. It is also possible to determine with majority decision whether or not the result is within a predetermined range. In addition, when the result is significantly different, an adjustment signal indicating the degree of difference may be generated, to increase the amount of change in the amount of drive current. Moreover, because it is desired to avoid the loss of synchronization of the motor as much as possible, it is also preferable to initially start driving with almost full-power and gradually adjust the power in a decreasing direction.

The zero-cross detecting unit 64 and the zero-cross determining unit 66 may be formed with hardware or software using functions of a microcomputer or the like.

EXPLANATION OF REFERENCE NUMERALS

12 OUTPUT CONTROL CIRCUIT; 14 OUTPUT CIRCUIT; 22, 24 COIL; 26 ROTOR; 32, 72 SWITCH; 34 COMPARATOR; 36, 70 DRIVE CURRENT ADJUSTING CIRCUIT; 38, 86 OFFSET GENERATING CIRCUIT; 40 COUNTER; 42, 44 AND CIRCUIT; 46 SETTING CIRCUIT; 48 FLIP-FLOP; 50 TIMING SETTING CIRCUIT; 62 SAMPLING CIRCUIT; 64 ZERO-CROSS DETECTING UNIT; 66 ZERO-CROSS DETERMINING UNIT; 74, 84 ADC; 76 CONTROL LOGIC; 78 TIMING CIRCUIT; 82 DIFFERENTIAL AMPLIFIER CIRCUIT; 100 DRIVER; 200 MOTOR

What is claimed is:

1. A driver circuit which supplies a motor drive current to a stepping motor which comprises two coils and which rotates a rotor driven by the two coils by setting different phases for the motor drive currents supplied to the two coils, the driver circuit comprising:
   a detecting circuit including a comparator to compare a voltage between each terminal of a first of the two coils and to detect, during a high impedance period where a first coil of the two coils is in a high-impedance state, a point in time when an induced voltage generated in the first coil crosses a predetermined value, based on the comparison by the comparator;
   a controlling circuit which controls the amount of the motor drive current supplied to the first coil such that the point in time when the induced voltage crosses the predetermined value occurs near the center of the high impedance period, based on the detection by the detector; and
   a generator configured to generate an offset voltage to adjust the predetermined value.

2. The driver circuit according to claim 1, wherein the predetermined value is changeable.

3. The driver circuit according to claim 1, wherein
   the controlling circuit controls the amount of the motor drive current supplied to the first coil so that a phase of waveform of the induced voltage detected by the detecting circuit is advanced compared to the phase of the waveform of the motor drive current supplied to the first coil.

4. The driver circuit according to claim 1, wherein the controlling circuit uses a pulse width modulation and controls a duty ratio of the motor drive current supplied to the first coil.

5. A driver circuit which supplies a motor drive current to a stepping motor which comprises two coils and which rotates a rotor driven by the two coils by setting different phases for the motor drive currents supplied to the two coils, the driver circuit comprising:
   a detecting circuit including a comparator to compare a voltage between each terminal of a first coil of the two coils and to detect, during a high impedance period where a first coil of the two coils is in a high-impedance state, a point in time when an induced voltage generated in the first coil crosses a predetermined value, based on the comparison by the comparator;
   a controlling circuit which controls an amount of the motor drive current supplied to the first coil so that a phase of a waveform of the induced voltage is advanced compared to a phase of a waveform of the motor drive current supplied to the first coil, based on the detection by the detector; and
   a generator configured to generate an offset voltage to adjust the predetermined value.

* * * * *